(12) United States Patent
Wang

(10) Patent No.: US 9,772,695 B2
(45) Date of Patent: Sep. 26, 2017

(54) MOUSE ADJUSTING DEVICE

(71) Applicant: DEXIN CORPORATION, New Taipei (TW)

(72) Inventor: Ting-Sheng Wang, New Taipei (TW)

(73) Assignee: DEXIN CORPORATION, New Taipei (TW)

( * ) Notice: Subject to any disclaimer, the term of this patent is extended or adjusted under 35 U.S.C. 154(b) by 366 days.

(21) Appl. No.: 14/593,191

(22) Filed: Jan. 9, 2015

(65) Prior Publication Data

US 2016/0109964 A1 Apr. 21, 2016

(30) Foreign Application Priority Data

Oct. 15, 2014 (TW) .............................. 103135695 A

(51) Int. Cl.
*G06F 3/02* (2006.01)
*G09G 5/00* (2006.01)
*G06F 3/0354* (2013.01)
*G06F 3/038* (2013.01)

(52) U.S. Cl.
CPC .......... *G06F 3/03543* (2013.01); *G06F 3/038* (2013.01); *G06F 2203/0337* (2013.01)

(58) Field of Classification Search
None
See application file for complete search history.

(56) References Cited

U.S. PATENT DOCUMENTS

| | | | | |
|---|---|---|---|---|
| 4,831,736 A * | 5/1989 | Bryant, Sr. | ............. | G06F 3/039 33/1 M |
| 5,870,081 A * | 2/1999 | Wu | ...................... | G06F 3/03543 345/163 |
| 6,198,473 B1 * | 3/2001 | Armstrong | .......... | G06F 3/03543 345/163 |
| 6,580,420 B1 * | 6/2003 | Wang | .................. | G06F 3/03541 345/157 |
| 6,697,043 B1 * | 2/2004 | Shahoian | ................ | A63F 13/06 345/156 |
| 7,567,341 B2 * | 7/2009 | Dolfi | .................... | G06F 3/03543 356/28 |
| 2004/0189593 A1 * | 9/2004 | Koay | ................... | G06F 3/03543 345/156 |
| 2007/0251810 A1 * | 11/2007 | Corcoran | ............ | G06F 3/03543 200/276.1 |
| 2008/0204415 A1 * | 8/2008 | Jung | ..................... | G06F 3/0317 345/166 |

* cited by examiner

*Primary Examiner* — Kent Chang
*Assistant Examiner* — William Lu
(74) *Attorney, Agent, or Firm* — Li & Cai Intellectual Property (USA) Office

(57) ABSTRACT

A mouse adjusting device of a mouse used to adjust the height of a sensing module of the mouse includes a slidable base, a sensor carrier, and an adjusting element. The moving base is movably disposed in the mouse. The bottom portion of the slidable base has at least a ramp portion. The sensor carrier is disposed in the mouse and below the slidable base. The sensor carrier with the sensing module is liftable and lowerable in the mouse. The top portion of the sensor carrier has at least a block portion abutting against the ramp portion of the slidable base. The adjusting element has a drive screw and a drive nut. The drive nut is embedded in the slidable base. An end of the drive screw is rotatably bolted to the drive nut, and another end of the driving screw is rotatably exposed outside the mouse.

18 Claims, 8 Drawing Sheets

MOUSE ADJUSTING DEVICE

BACKGROUND OF THE INVENTION

1. Field of the Invention

The present disclosure relates to a mouse adjusting device; in particular, to a mouse adjusting device for adjusting the height of a sensing module of a mouse.

2. Description of Related Art

In today's world of ever advancing technology, personal computers, laptops, tablets, and portable devices of different dimensions have become irreplaceable tools in people's lives, and mouses are common input devices for the above-mentioned equipment. However, typical mouses do not meet the demands of specific users, e.g. professional e-sport gamers. Therefore, adjustable mouses which allow users to adjust the sensitivity (e.g. for gaming, office work) are made in the market. Mouse sensitivity is especially important to professional e-sport gamers, because quick movements and micromanagement are required in games, e.g. turning around quickly, and aiming at the enemy causes the mouse to be raised slightly and then lowered. If the mouse sensitivity is too high, continued sensing when the gamer does not raise the mouse sufficiently high results in error. However, adjusting the mouse sensitivity during games requires jumping to an operating system window to adjust settings, which is impractical.

Hence, the present inventor believes the above mentioned disadvantages can be overcome, and through devoted research combined with application of theory, finally proposes the present disclosure which has a reasonable design and effectively improves upon the above mentioned disadvantages.

SUMMARY OF THE INVENTION

The object of the present disclosure is to provide a mouse adjusting device for raising and lowering a sensing module of a mouse, to accommodate needs of users.

In order to achieve the aforementioned objects, the present disclosure provides a mouse adjusting device for adjusting the height of a sensing module of a mouse. The mouse adjusting device includes: a slidable base slidably disposed at a lower portion of the mouse and formed with at least one ramp portion thereunder; a sensor carrier raisably and lowerably disposed at the lower portion of the mouse and under the slidable base, wherein the sensor carrier accommodates the sensing module, and a top portion of the sensor carrier is formed with at least one block portion abutting the ramp portion of the slidable base; and an adjusting element having a drive screw and a drive nut, wherein the drive nut is embedded in the slidable base, one end of the drive screw is rotatably exposed outside the mouse, and another end of the drive screw is rotatably engaged to the drive nut.

In summary of the above, the mouse adjusting device of the present disclosure through the sliding of the slidable base, the raising and lowering of the sensor carrier, engagement between the ramp portion formed at a bottom portion of the slidable base and a block portion formed at the top portion of the sensor carrier, rotatable connection of the drive screw of the adjusting element to the drive nut, and embedment of the drive nut on the slidable base, when the drive screw rotates relative to the drive nut, the drive nut, the slidable base and the block portion are driven to move horizontally, such that the ramp portion is forced to slide with respect to the block portion, thereby driving the sensor carrier and the sensing module to move vertically, such that rotation of the adjusting element enables the adjusting device to translate horizontal movement of the slidable base to a vertical movement of the sensor carrier, achieving the function of raising and lowering the sensing module to meet different needs of the user.

In order to further the understanding regarding the present disclosure, the following embodiments are provided along with illustrations to facilitate the disclosure of the present disclosure.

DETAILED DESCRIPTION OF THE PREFERRED EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings.

Figure 1:
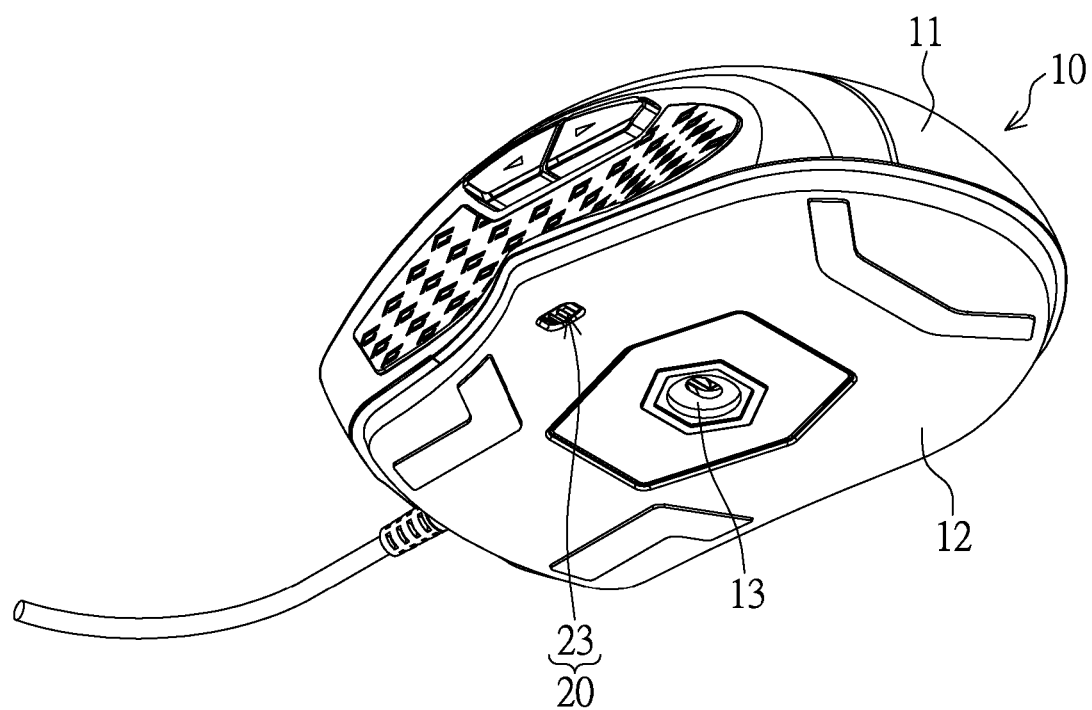
FIG. 1 shows a perspective view of a first embodiment of the present disclosure.
Figure 2:
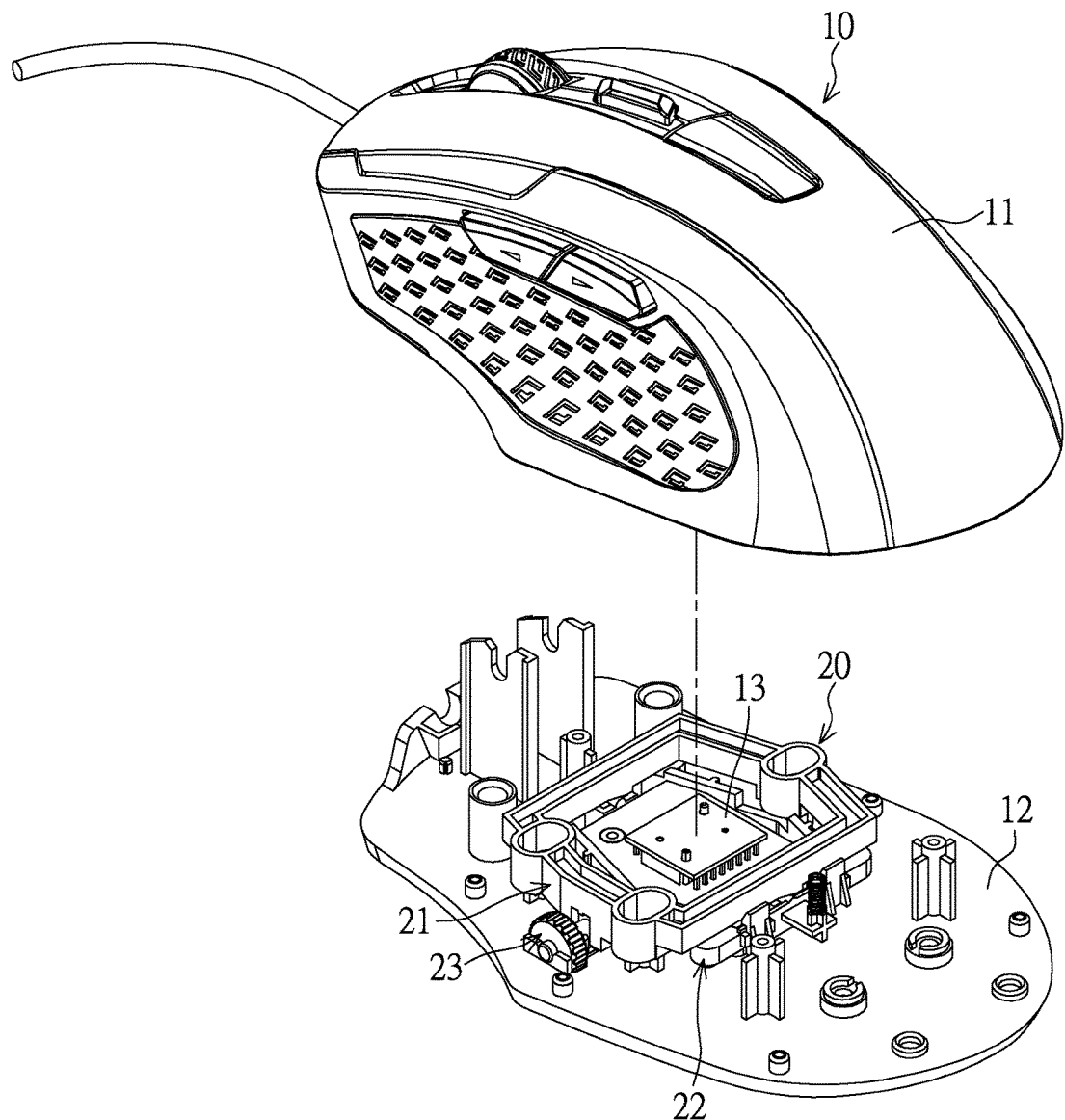
FIG. 2 shows a first exploded view of a first embodiment of the present disclosure.
Figure 3:
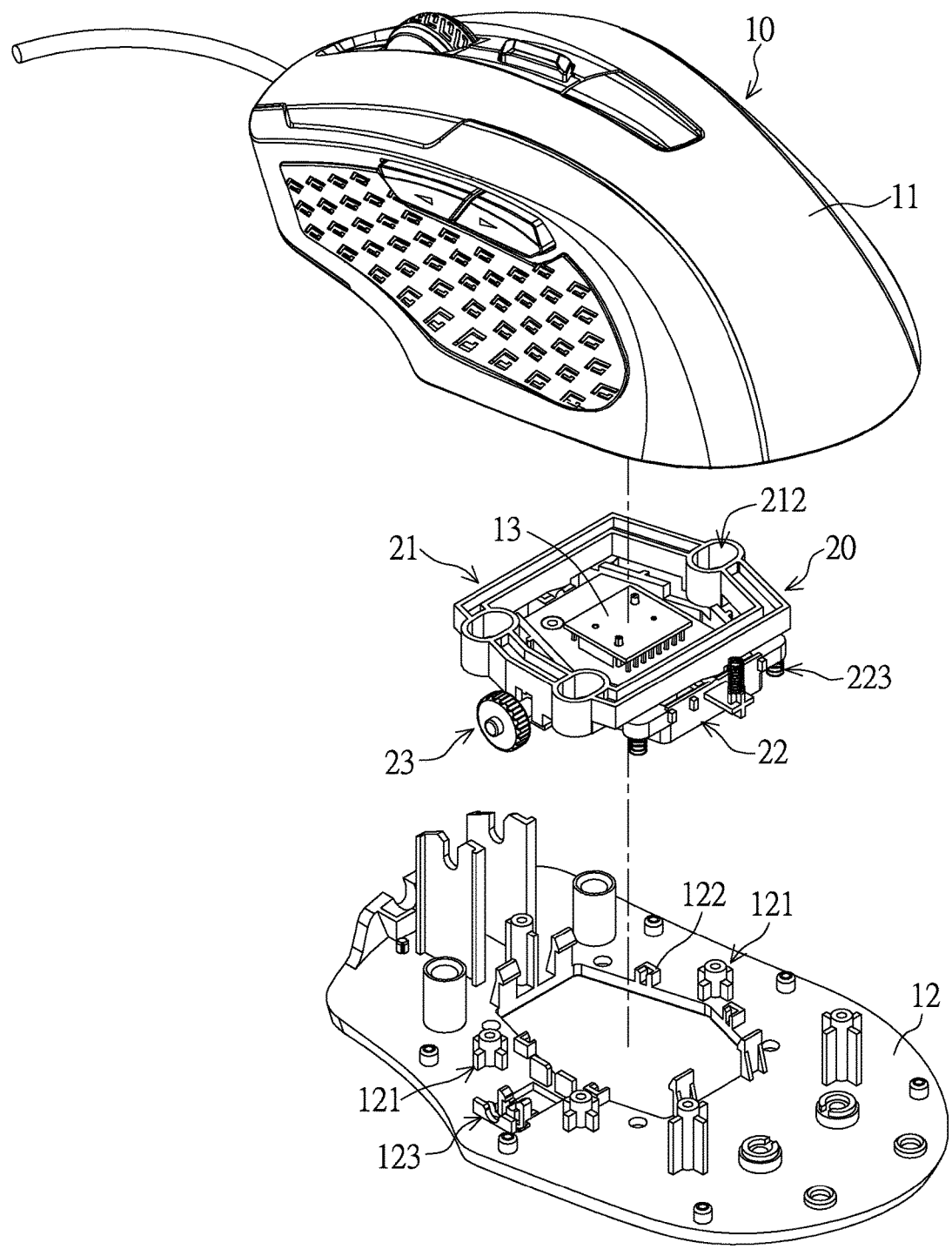
FIG. 3 shows a second exploded view of a first embodiment of the present disclosure.

Referring to FIG. 1 to FIG. 4 showing a first embodiment of the present disclosure, the present disclosure provides a mouse adjusting device. As shown in FIG. 1 and FIG. 2, a mouse 10 can be defined into an upper portion 11 and a lower portion 12, and an adjusting device 20 is disposed at the lower portion 12 of the mouse 10. The adjusting device 20 adjusts the height of a sensing module 13 of the mouse 10. The sensing module 13, e.g. an optical sensing module or a laser sensing module, detects direction and distance of motion of the mouse 10 for positioning the cursor. The present embodiment does not limit the type of the sensing module 13. Additionally, it is worth noting that the mouse 10 includes other components, such as a roller, buttons, micro switches, etc. respectively disposed at the upper portion 11 or the lower portion 12 of the mouse 10, and not further described herein. The adjusting device 20 of the present embodiment includes a slidable base 21, a sensor carrier 22, and an adjusting element 23.

Figure 4:
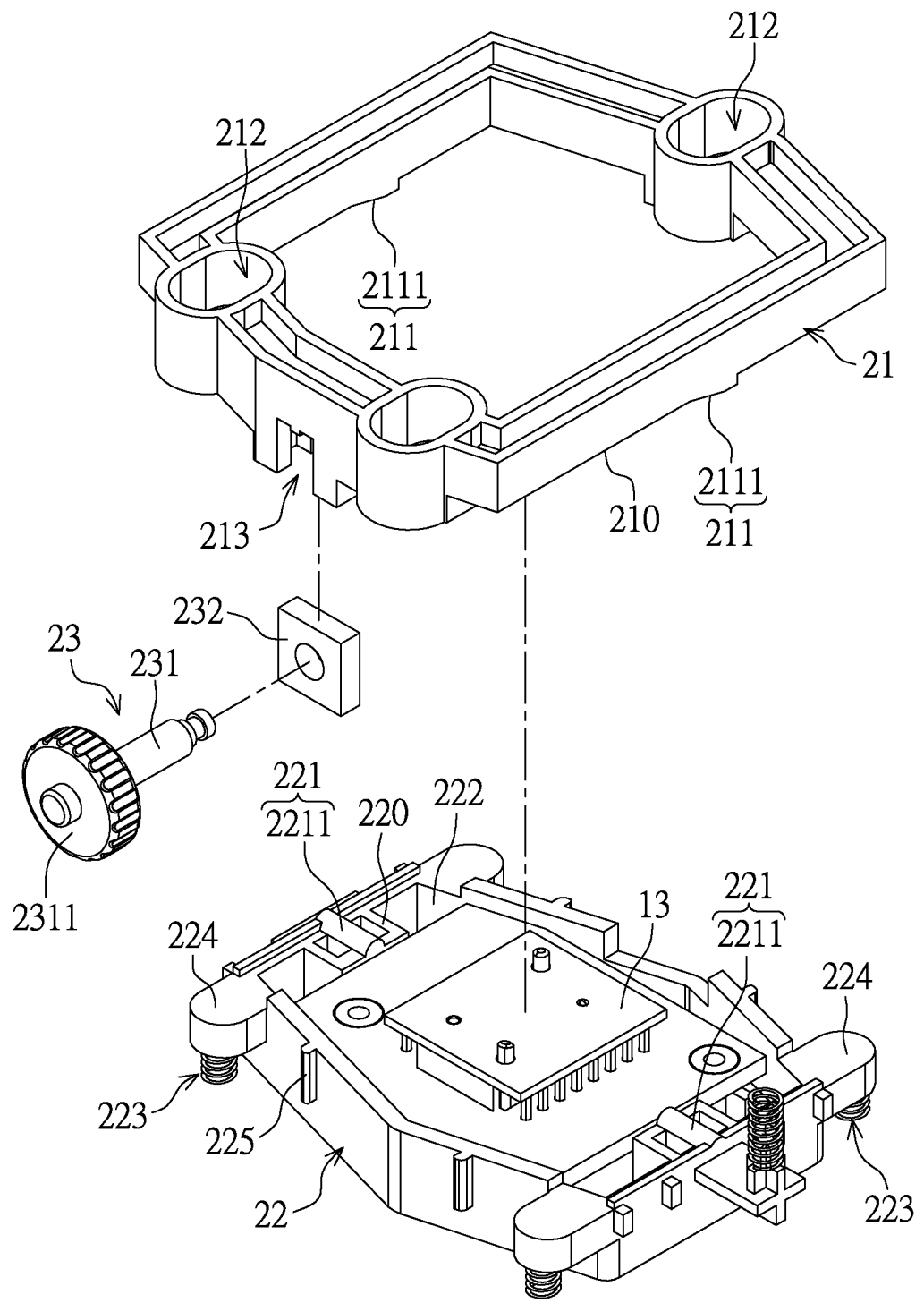
FIG. 4 shows a third exploded view of a first embodiment of the present disclosure.

The slidable base 21 is slidably disposed at the lower portion 12 of the mouse 10. The bottom portion 210 of the slidable base 21 has at least one ramp portion 211. In the present embodiment, the bottom portion 210 of the slidable base 21 has two ramp portions 211 which are parallel. Preferably, the shape of the ramp portions 211 is a trapezoid, and the ramp portions 211 each have a slanted face 2111 (as shown in FIG. 4).

The sensor carrier 22 is raisably and lowerably disposed at the lower portion 12 of the mouse 10 and under the slidable base 21. The sensor carrier 22 accommodates the sensing module 13, and a top portion 220 of the sensor carrier 22 is formed with at least one block portion 221 abutting the ramp portion 211. In the present embodiment, the top portion 220 of the sensor carrier 22 has two block portions 221 which are parallel, such that the two block portions 221 can respectively abut the two ramp portions 211. Preferably, the block portions 221 are curved protrusions and each have a curved face 2211 (as shown in FIG. 4).

The adjusting element 23 has a drive screw 231 and a drive nut 232. The drive nut 232 is embedded in the slidable base 21. One end of the drive screw 231 is rotatably exposed outside the mouse 10, and another end of the drive screw 231 is rotatably engaged to the drive nut 232. Therefore, when the drive screw 231 of the adjusting element 23 rotates with respect to the drive nut 232, the drive nut 232 and the slidable base 21 are driven to move horizontally along the direction of the axis of the drive screw 231, thereby driving the ramp portions 211 to move horizontally with the slidable base 21, in turn driving the block portions 221 abutting the ramp portions 211 to move vertically, thereby driving the sensor carrier 22 and the sensing module 13 accommodated thereon to move vertically. The following describe the slidable base 21, sensor carrier 22, and adjusting element 23, and then the connection relationships and relative motions therebetween.

The slidable base 21 is a frame having multiple edges, in other words a structure formed by connected beams, or in other words the ramp portions 211 of the slidable 21 is formed by downward extensions of the bottom portion 210 of the beams. Additionally, the slidable base 21 is formed with a plurality of through holes 212, and the lower portion 12 of the mouse 10 is formed with a plurality of columns 121. The columns 121 respectively pass through the through holes 212. Through the couplings of the through holes 212 and the columns 121, the slidable base 21 stably moves horizontally about the lower portions 12 of the mouse 10, and the distance of horizontal movement of the slidable base 21 is limited. Additionally, the through holes 212 can be formed with screws, such that the slidable base 21 can stably move horizontally without disengaging. Also, the slidable base 21 is formed with an embedding groove 213, and the drive nut 232 is embedded in the embedding groove 213.

The center of the sensor carrier 22 is recessed and formed with an accommodating portion 222. The sensing module 13 is accommodated in the accommodating portion 222 such that the sensor carrier 22 carries the sensing module 13. Additionally, the sensor carrier 22 has a plurality of elastic units 223. One end of each of the elastic units 223 is vertically disposed at the sensor carrier 22, and another end of each of the elastic units 223 abuts the lower portion 12 of the mouse 10. Preferably the sensor carrier 22 has four elastic units 223, respectively disposed at four corners of the sensor carrier 22. Each of the four corners of the sensor carrier 22 is formed with an extension portion 224 extending outward and horizontally. One end of each of the elastic units 223 is vertically disposed at the respective extension portion 224 of the sensor carrier 22. Another end of each of the elastic units 223 vertically abuts the lower portion 12 of the mouse 10. Therefore, when the elastic units 223 are compressed, the sensor carrier 22 is lowered, and when the elastic units 223 are released, the sensor carrier 22 is raised, such that the sensor carrier 22 is raisably and lowerably disposed at the lower portion 12 of the mouse through the compression and release of the elastic units 223. Moreover, through the arrangement of the elastic units 223, the block portions 221 of the sensor carrier 22 can resiliently abut the ramp portions 211 of the slidable base 21 through the elastic force provided by the elastic units 223, such that the ramp portions 211 and the block portions 221 are securely in contact. Additionally, edges of the sensor carrier 22 are formed with a plurality of vertical guiding portions 225, and the lower portion 12 of the mouse 10 is formed with a plurality of recesses 122. The guiding portions 225 can respectively slide into the recesses 122. Through the couplings of the guiding portions 225 and the recesses 122, the raising and lowering of the sensor carrier 22 is not tilted derailed.

One end of the drive screw 231 of the adjusting element 23 is formed with a wheel 2311 rotatably exposed outside an opening structure 123 of the lower portion 12 of the mouse 10. The exposed wheel 2311 can be turned by the user to adjust the height of the sensing module 13.

Figure 5:
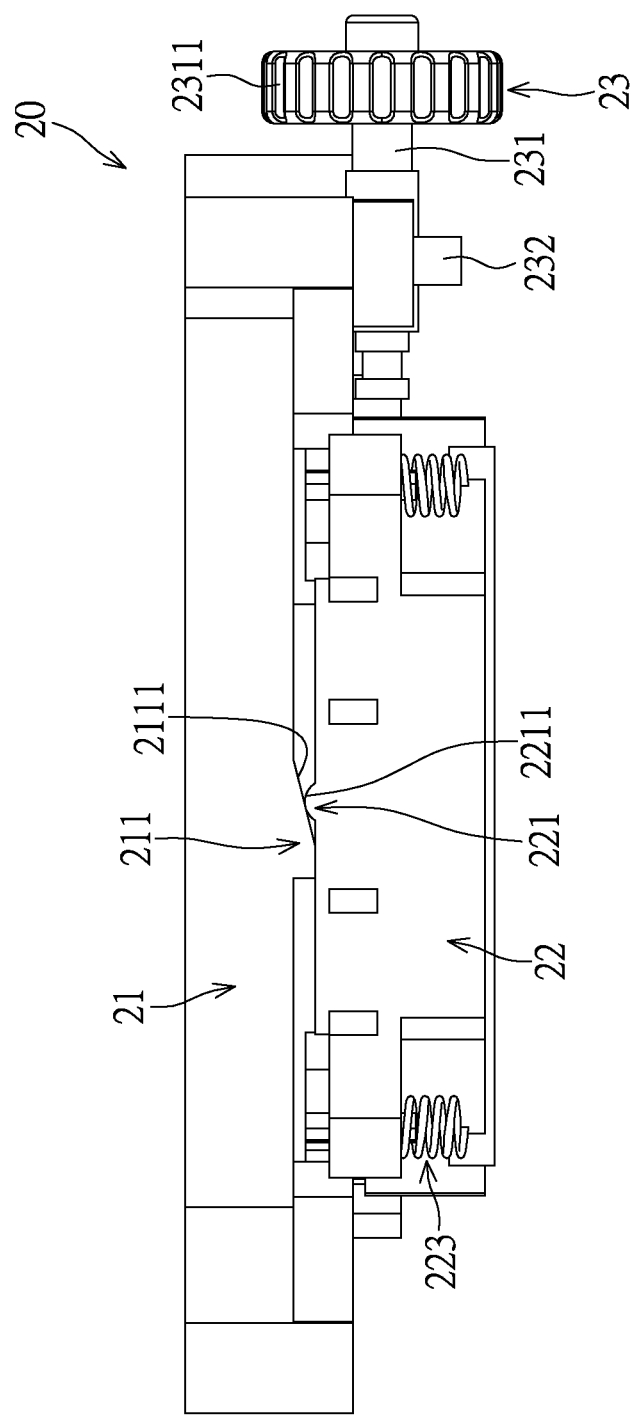
FIG. 5 is a first schematic diagram showing motion of a first embodiment of the present disclosure.
Figure 6:
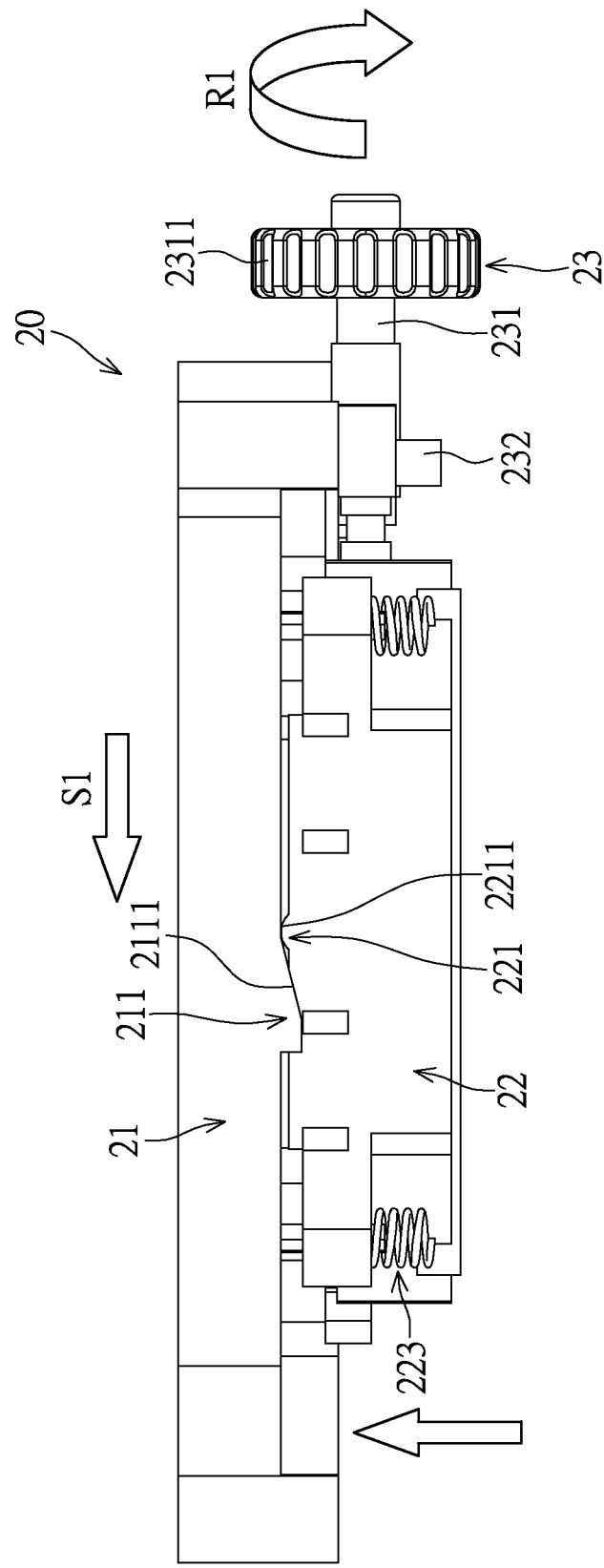
FIG. 6 is a second schematic diagram showing motion of a first embodiment of the present disclosure.
Figure 7:
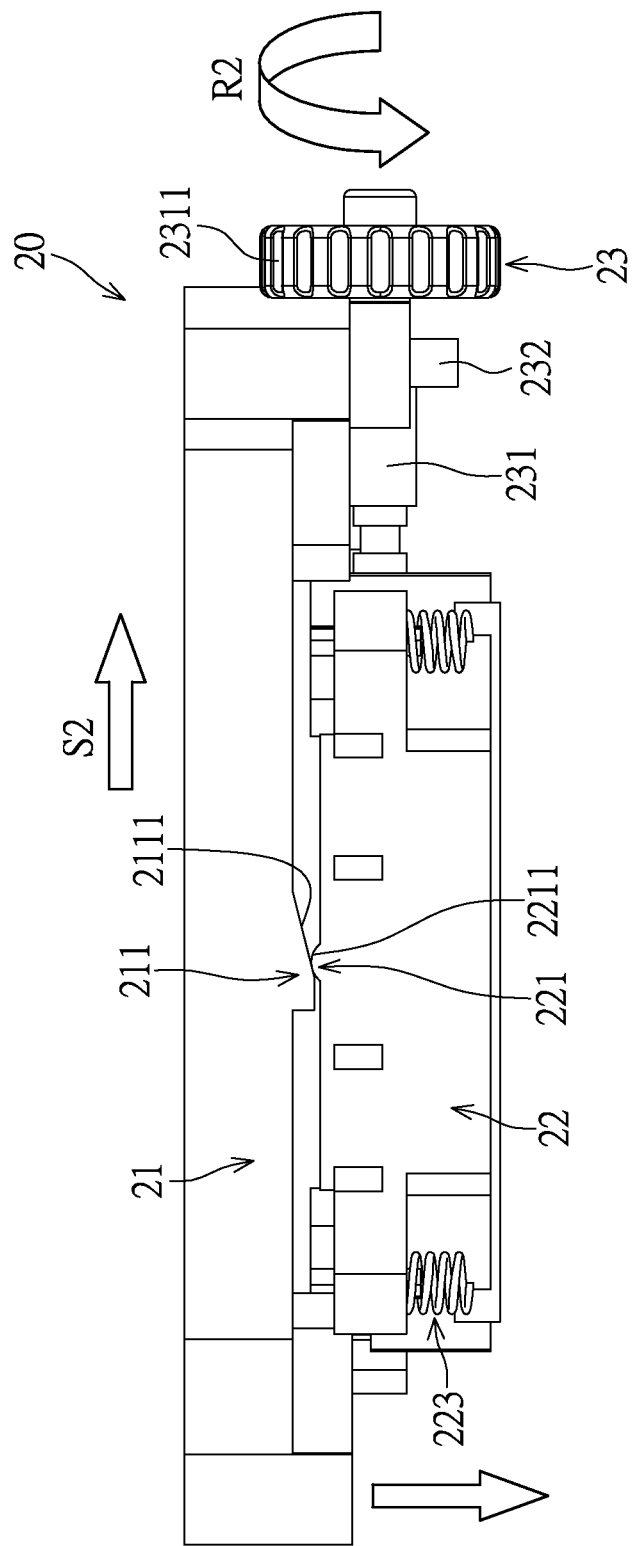
FIG. 7 is a third schematic diagram showing motion of a first embodiment of the present disclosure.

Please refer to FIG. 5 to FIG. 7, in conjunction with FIG. 1 to FIG. 4. FIG. 5 to FIG. 7 are schematic diagrams showing motions of a mouse adjusting device of the present embodiment.

As shown in FIG. 5, when the wheel 2311 of the adjusting element 23 has not been turned by the user, the curved face 2211 of the block portion 221 of the sensor carrier 22 abuts the middle of the slanted face 2111 of the ramp portion 211 of the slidable base 21. At this moment, the sensing module 13 accommodated by the sensor carrier 22 is positioned at a predetermined height.

As shown in FIG. 6, when the user turns the wheel 2311 of the adjusting element 23 such that the drive screw 231 rotates in a first rotating direction R1 (i.e. a clock-wise direction) relative to the drive nut 232, the drive nut 232 at the slidable base 21 is driven to move in a first direction S1 (i.e. leftward) along the direction of the axis of the drive screw 231, thereby driving the ramp portion 211 to move horizontally with the slidable base 21 in the first direction S1, in turn driving the block portion 221 abutting the slanted face 2111 of the ramp portion 211 to move upward along the slanted face 2111 through the elastic force provided by the elastic units 223, thereby driving the sensor carrier 22 and the sensing module 13 accommodated thereon to move upward.

As shown in FIG. 7, when the user turns the wheel 2311 of the adjusting element 23 such that the drive screw 231 rotates in a second rotating direction R2 (i.e. a counter clock-wise direction) relative to the drive nut 232, the drive nut 232 at the slidable base 21 is driven to move in a second direction S2 (i.e. rightward) along the direction of the axis of the drive screw 231, thereby driving the ramp portion 211 to move horizontally with the slidable base 21 in the second direction S2, in turn driving the ramp portion 211 to press the block portion 221 abutting the slanted face 2111 thereof and drive the block portion 221 to move downward along the slanted face 2111 of the ramp portion 211 through the elastic force provided by the elastic units 223, thereby driving the sensor carrier 22 and the sensing module 13 accommodated thereon to move downward.

The drive screw 231 of the present embodiment can rotate in the first or second rotating direction S1, S2 with respect to the drive nut 232, driving the slidable base 21 to move along the direction of the axis of the drive screw 231 horizontally in the first or second directions S1, S2 with respect to the sensor carrier 22. The curved face 2211 of the block portion 221 of the sensor carrier 22 slidably abuts the slanted face 2111 of the ramp portion 211, such that when the block portion 221 and the ramp portion 211 slide with respect to each other, the sensor carrier 22 moves with respect to the slidable base 21 vertically upward or downward, thereby adjusting the height of the sensing module 13.

Figure 8:
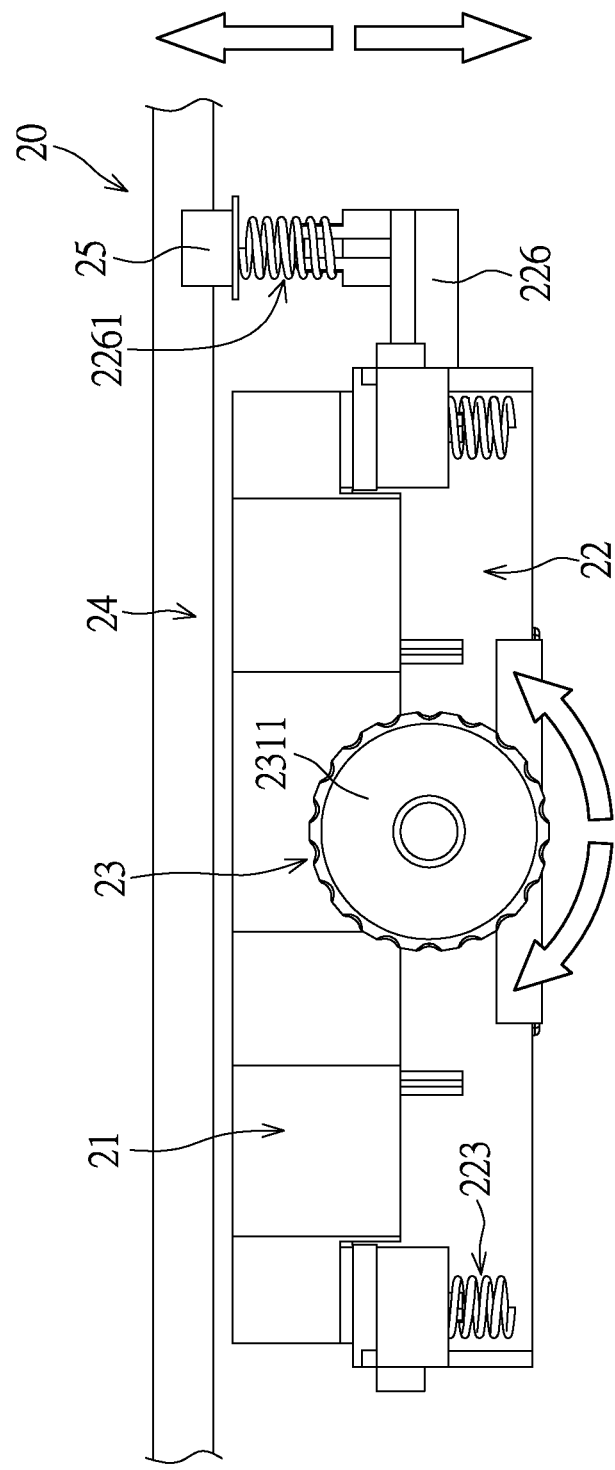
FIG. 8 is a schematic diagram showing motion of another embodiment of the present disclosure.

FIG. 8 shows another embodiment of a mouse adjusting device of the present disclosure. The adjusting device 20 of the mouse 10 of the present embodiment is substantially the same as that of the previous embodiment (as shown in FIG. 1 to FIG. 4), with the main difference lying in that the adjusting device 20 further includes a control circuit board 24 and a pressure sensor 25 disposed at the control circuit board 24. The pressure sensor 25 can be for example piezoelectric, piezoresistive, capacitive, or metal thin film sensors, but is not limited to the above. Preferably, the pressure sensor 25 of the present embodiment is a piezoresistive pressure sensor positioned at the underside of the control circuit board 24. The control circuit board 24 is disposed in the mouse 10 and is positioned above the slidable base 21. The sensor carrier 22 extends horizontally outward to form an arm 226. The arm 226 has a pressure spring 2261, one end of which is disposed at the arm 226, and another end of which vertically abuts the pressure sensor 25. Therefore, when the user rotates the wheel 2311 of the adjusting element 23, such that the sensor carrier 22 moves upward or downward, the pressure spring 2261 is compressed or released as the sensor carrier 22 moves upward or downward, such that the force of the pressure spring abutting the pressure sensor 25 changes, such that the resistivity of the pressure sensor 25 changes, and the control circuit board 24 can determine by the change in resistivity the height of the sensing module 13, and transmit the result to a display unit (e.g. an LED signal lighting on the mouse, screen, etc.) for display. Therefore, the adjusting device of the present embodiment is a mechanical and electrical device.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A mouse adjusting device for adjusting a height of a sensing module of a mouse, comprising:
   a slidable base, slidably disposed at a lower portion of the mouse and formed with at least one ramp portion at a bottom portion of the slidable base;
   a sensor carrier, raisably and lowerably disposed at the lower portion of the mouse, wherein the sensor carrier accommodates the sensing module, and a top portion of the sensor carrier is formed with at least one block portion configured to abut the respective ramp portion; and
   an adjusting element having a drive screw and a drive nut, wherein the drive nut is embedded in the slidable base, one end of the drive screw is rotatably exposed outside the mouse, and another end of the drive screw is rotatably engaged to the drive nut;
   wherein the slidable base is formed with a plurality of through holes, each through hole is an oval-like-shaped hole with a long axis along a horizontal axis, the lower portion of the mouse is formed with a plurality of columns, and the columns respectively pass through the through holes to allow the slidable base to move horizontally about the lower portion of the mouse, and to limit a distance of horizontal movement of the slidable base.

2. The mouse adjusting device according to claim 1, wherein the ramp portions formed at the bottom portion of the slidable base amount to two and the two ramp portions are parallel, the block portions formed at the top portion of the sensor carrier amount to two and the two block portions are parallel, and the two block portions respectively abut the two ramp portions.

3. The mouse adjusting device according to claim 1, wherein each of the ramp portions has a trapezoid shape.

4. The mouse adjusting device according to claim 1, wherein each of the block portions is a curved protrusion.

5. The mouse adjusting device according to claim 1, wherein each of the ramp portion has a slanted face, each of the block portion has a curved face, and the curved face of each of the protruding portion slidably abuts the slanted face of the respective ramp portion.

6. The mouse adjusting device according to claim 1, wherein the sensor carrier has a plurality of elastic units, each of the elastic units is vertically disposed at the sensor carrier at one end and vertically abuts the lower portion of the mouse at another end, and each of the block portions of the sensor carrier is driven by the elastic units to abut the respective ramp portion of the slidable base.

7. The mouse adjusting device according to claim 1, wherein the slidable base is formed with an embedding groove, and the drive nut is embedded in the embedding groove.

8. The mouse adjusting device according to claim 1, wherein a center portion of the sensor carrier is recessed and formed with an accommodating portion, and the sensing module is accommodated in the accommodating portion.

9. The mouse adjusting device according to claim 1, wherein one end of the drive screw of the adjusting element is formed with a wheel, and the wheel is movably exposed outside an opening structure formed at the lower portion of the mouse.

10. The mouse adjusting device according to claim 1, further comprising a control circuit board and a pressure sensor disposed at the control circuit board, and the control circuit board is disposed in the mouse and positioned above the slidable base.

11. The mouse adjusting device according to claim 10, wherein the sensor carrier extends horizontally outward to form an arm, the arm has a pressure spring, one end of the pressure spring is vertically disposed at the arm, and another end of the pressure spring vertically abuts the pressure sensor.

12. A mouse adjusting device for adjusting a height of a sensing module of a mouse, comprising:
   a slidable base, slidably disposed at a lower portion of the mouse and formed with at least one ramp portion at a bottom portion of the slidable base;
   a sensor carrier, raisably and lowerably disposed at the lower portion of the mouse, wherein the sensor carrier accommodates the sensing module, and a top portion of the sensor carrier is formed with at least one block portion configured to abut the respective ramp portion; and
   an adjusting element having a drive screw and a drive nut, wherein the drive nut is embedded in the slidable base, one end of the drive screw is rotatably exposed outside the mouse, and another end of the drive screw is rotatably engaged to the drive nut;
   wherein the slidable base is formed with a plurality of through holes, each through hole is an oval-like-shaped hole with a long axis along a horizontal axis, the lower portion of the mouse is formed with a plurality of columns, and the columns respectively pass through the through holes to allow the slidable base to move horizontally about the lower portion of the mouse, and to limit a distance of horizontal movement of the slidable base;

wherein the slidable base is a frame-like structure formed by connected beams, the ramp portions amount to two and the two ramp portions are formed by downward extensions of bottom portions of the beams that are in parallel, the block portions amount to two and the two block portions respectively abut the two ramp portions so as to prevent unbalanced horizontal movement of the beams of the slidable base.

13. The mouse adjusting device according to claim 12, wherein each of the ramp portions has a trapezoid shape.

14. The mouse adjusting device according to claim 13, wherein each of the block portions is a curved protrusion.

15. The mouse adjusting device according to claim 14, wherein each of the ramp portion has a slanted face, each of the block portion has a curved face, and the curved face of each of the protruding portion slidably abuts the slanted face of the respective ramp portion.

16. The mouse adjusting device according to claim 12, wherein the sensor carrier has a plurality of elastic units, each of the elastic units is vertically disposed at the sensor carrier at one end and vertically abuts the lower portion of the mouse at another end, and each of the block portions of the sensor carrier is driven by the elastic units to abut the respective ramp portion of the slidable base.

17. The mouse adjusting device according to claim 12, further comprising a control circuit board and a pressure sensor disposed at the control circuit board, and the control circuit board is disposed in the mouse and positioned above the slidable base.

18. The mouse adjusting device according to claim 17, wherein the sensor carrier extends horizontally outward to form an arm, the arm has a pressure spring, one end of the pressure spring is vertically disposed at the arm, and another end of the pressure spring vertically abuts the pressure sensor.

* * * * *